UNITED STATES PATENT OFFICE 2,534,191

PREPARATION OF PENTAERYTHRITOL

John Cryer, New Lenox, and Jay C. Owens and Richard Jui Fu Lee, Chicago, Ill., assignors to The Sherwin-Williams Company, Cleveland, Ohio, a corporation of Ohio No Drawing. Application April 19, 1947, Serial No. 742,730

23 Claims. (Cl. 260—635)

This invention relates to an improved method of preparing pentaerythritol in the presence of a catalytic agent, and more particularly, to an improved method of carrying out a catalyzed reaction of formaldehyde and acetaldehyde to produce pentaerythritol.

A conventional prior method of preparing pentaerythritol has been to react formaldehyde with acetaldehyde in the presence of water and an alkaline agent such as calcium hydroxide, sodium hydroxide, or the like. This method involved what was believed to be a two stage reaction, the first stage being an aldol condensation brought about by the presence of the alkali and producing pentaerythrose as follows:

(I) 
$$3H \cdot CHO + CH_3 \cdot CHO \rightarrow (CH_2OH)_3C \cdot CHO$$

and the second stage being a reduction of the pentaerythrose by reaction with additional formaldehyde to form pentaerythritol as follows:

(II) 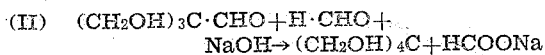
$$(CH_2OH)_3C \cdot CHO + H \cdot CHO + NaOH \rightarrow (CH_2OH)_4C + HCOONa$$

where sodium hydroxide is the alkali employed. This process involved several disadvantages, among which was the occurrence of side reactions forming sugar-like syrups that greatly reduced the yield of pentaerythritol. Further, the reaction time generally required was long, involving a substantial induction period under reaction conditions before the reaction began. Often, because of some slight undetectable difference in conditions, the reaction would take place only to a small degree, giving very poor yields or no yield at all. When conditions were favorable and the reaction proceeded more or less according to theory, it was difficult to control the reaction because of its highly exothermic nature. Because of the above mentioned disadvantages, the yields from batch to batch were not uniform, and it was difficult to predict results and costs of production.

Numerous patents have been granted on various methods of carrying out the basic reactions described above, which methods involved varying the order or proportions in which the reactants or the condensing agent are added, controlling the pH or the temperature of the reaction mixture, etc. However, the best of those various methods have produced only relatively minor improvements in the technique of carrying out the basic reactions.

In U. S. Patent No. 2,329,514 to Cox, it was disclosed that the above described process could be improved in certain respects by employing a catalyst for the reaction selected from the class consisting of cuprous oxide, cuprous hydroxide, cupric oxide, cupric hydroxide, silver oxide, silver hydroxide, and elemental active nickel, copper, and platinum. However, such catalysts are apparently effective only in accelerating the second stage of the two stage reaction described above and, according to the teachings of the patent, are preferably added after the initial stage of the reaction has been allowed to proceed to a considerable extent, but before the second stage of the reaction has proceeded sufficiently to form syrupy reaction products. The invention disclosed in that patent does not teach any way to reduce or eliminate the induction period generally required before the first stage of the reaction begins or to control effectively the speed of that reaction after it has begun.

Thus, it is an object of this invention to provide an improved process for the preparation of pentaerythritol characterized by elimination, or material diminution, of the induction period and by relatively high yields obtainable with uniform consistency.

A further object of the invention is to provide an easily controlled process of producing pentaerythritol by the reaction of formaldehyde and acetaldehyde, whereby a standardized procedure may be more safely adopted without sacrificing reaction speed or yield efficiency.

The class of catalysts which we have discovered to be suitable for use in accomplishing the foregoing objectives are organic substances which may best be described as "auto-catalytic," since they are substances capable of being formed in the reaction mixture and under the reaction conditions employed to produce pentaerythritol. However, while they may be formed to varying degrees during the course of the principal reaction, depending upon small changes in conditions or reactants which are difficult to control, they also may not be formed at all, or may be formed too slowly, so that the principal reaction never occurs, or proceeds slowly and follows an undesirable course, ultimately producing an objectionable proportion of unwanted by-products and a consequent low yield of pentaerythritol and bringing about many other objectionable complications.

We have found that the addition of a small quantity of one or more of these autocatalytic substances at the beginning of the reaction substantially reduces or entirely eliminates the induction period characteristic of prior art processes. In addition, such use of these substances brings about higher and more uniform yields with more easily standardized procedures than has heretofore been possible, whether a batch process or a continuous process is employed. As a result, increased economies in the production of pentaerythritol are achieved.

The organic substances that may be produced during the course of the principal reaction and that are operative to varying degrees as catalysts for that reaction are numerous. Among the simpler members of this class of compounds are several that may be formed by the reaction of formaldehyde with itself (or with itself and water), probably in accordance with the following formulae:

(a) Glycollic aldehyde—

$$H \cdot CHO + H \cdot CHO \rightarrow CH_2OH \cdot CHO$$

(b) Glyceraldehyde—

$$CH_2OH \cdot CHO + H \cdot CHO \rightarrow CH_2OH \cdot CHOH \cdot CHO$$

(c) Dihydroxy acetone—

$$CH_2OH \cdot CHO + H \cdot CHO \rightarrow CH_2OH \cdot CO \cdot CH_2OH$$

(d) Ethylene glycol—

$$CH_2OH \cdot CHOH \cdot CHO + H_2O \rightarrow (CH_2OH)_2 + H \cdot COOH$$

(e) Glycerine—

$$CH_2OH \cdot CHOH \cdot CHO + H \cdot CHO + H_2O \rightarrow (CH_2OH)_2CHOH + H \cdot COOH$$

The class of autocatalysts even includes the residue that remains after formaldehyde and acetaldehyde have been reacted to produce pentaerythritol, the reaction liquors have been vacuum distilled, and the pentaerythritol formed by crystallization has been filtered off. This residue may be employed to catalyze a subsequent reaction of formaldehyde and acetaldehyde.

The above-mentioned substances do not comprise an exclusive list of operative autocatalysts for the reaction in question, but are mentioned by way of illustration only. All of the organic products tested which are capable of being formed from formaldehyde under the conditions of the reaction exhibit, to varying degrees, an ability to catalyze the reaction when employed in accordance with our invention. From the standpoint of cost, availability, and other practical considerations, however, glycerine and ethylene glycol are preferred catalysts for commercial operations.

A considerable number of additional substances of similar character, which are capable of being formed in the reaction mixture, are operative to varying degrees for the purpose indicated. Thus, while we have mentioned above certain illustrative and preferred autocatalytic compounds, it is to be understood that our invention involves the broad discovery that the reaction is autocatalytic in nature and that the addition of any of the several autocatalytic compounds that may occur in the course of the desired reaction insures that the reaction will proceed favorably with the above described attendant advantages.

The quantity of the autocatalyst that must be incorporated in a reaction mixture of formaldehyde and acetaldehyde in carrying out our invention is very minute compared to the quantities of the two principal reactants present. In most cases, only a trace of the autocatalyst need be employed to effect the desired improvement in the process.

The following specific examples illustrate in greater detail how our invention may be put into practice, though it is to be understood that the invention is not limited to the particular conditions set forth therein:

*Example 1*

A lime slurry, comprising 77 g. of 95% lime and 1300 g. of water, was placed in a reaction vessel. To this was added 0.6 g. of glycerine. The mixture was heated slowly to approximately 30° C. An aldehyde solution, containing 640 g. of 37½% formaldehyde and 89 g. of 99% acetaldehyde, was added to the lime slurry over a period 25 minutes. After the addition of the aldehyde solution to the reaction vessel, the reaction mixture was maintained at 30° C. for an additional 30 minutes, the temperature then being raised to 50° C. and held there for approximately one hour. The reaction mixture was then cooled to 35° C., and sufficient 1:1 sulphuric acid was added to precipitate the calcium as a sulphate. The mixture was filtered, and the filtrate was vacuum evaporated at a temperature between 45° C. and 50° C. to crystallize the crude pentaerythritol. The yield of crystalline pentaerythritol was 70.2%.

*Example 2*

A lime slurry of 84 g. of 95% lime and 1500 g. of water was made. To this was added 0.8 g. of ethylene glycol. While the foregoing mixture was held at a temperature of 17.5° C., an aldehyde solution comprising 640 g. of 37½% formaldehyde and 89 g. of 99% acetaldehyde was added over a period of one hour. After the reaction mixture had stood for two days at room temperature, the calcium was precipitated out as a sulphate and separated by filtration. The filtrate was crystallized by vacuum evaporation, a yield of 73.2% of crystalline pentaerythritol being obtained.

*Example 3*

To a lime slurry comprising 77 g. of 95% lime and 1300 g. of water was added 0.5 g. of dihydroxy diethyl ketone. While the foregoing mixture was held at a temperature of 30° C., an aldehyde solution containing 640 g. of 37½% formaldehyde and 89 g. of 99% acetaldehyde was added to the reaction vessel over a period of 15 minutes. The reaction mixture was then held at 30° C. for one hour; at the end of this period the temperature was raised to 55° C. for 12 minutes, and the calcium was precipitated as a sulphate and separated by filtration. The filtrate was vacuum evaporated to crystallize the pentaerythritol, a yield of 69.6% of crystalline pentaerythritol being obtained.

*Example 4*

An aldehyde solution was made from 802 g. of water, 640 g. of 37½% formaldehyde and 89 g. of 99% acetaldehyde. The aldehyde solution was added slowly to a reactor of a conventional laboratory continuous system after uniformity of operating conditions had been reached. Along with the aldehyde solution was added a lime slurry comprising 88.1 g. of water, 77 g. of 95% lime, and 1 g. of ethylene glycol so that the aldehydes and lime were present in the stoichiometric ratio. The mixture was held an average of 8 minutes in the reactor, which had a volume of 380 cc., the temperature of the reactor being maintained at 25° C. The reaction mixture flowed from the reactor into a receiver where the temperature rose spontaneously to between 35° C. and 40° C., and the mixture was held in the receiver for two hours. The calcium was then precipitated out as a sulphate and removed by filtration. The filtrate was vacuum evaporated at between 60° C. and 70° C., the pentaerythritol crystallizing out after approximately 12 hours. The yield of crystalline pentaerythritol was 72%.

Of the examples given above for carrying out the process of the invention, Examples 1, 2, and 3 illustrate batch processes carried out at different rates by controlling the temperature of the reaction mixture. Example 4 illustrates a continuous process. In both types of processes, the yield of pentaerythritol is consistently high.

The addition of catalysts of the class described to the initial phase of the formaldehyde-acetaldehyde reaction enables consistently high yields of pentaerythritol to be obtained under convenient process conditions; it reduces the reaction time required to obtain such high yields; and it brings about a greater uniformity in the rate of the reaction, thereby simplifying its control and assisting in the production of a uniform product. All of these individual advantages contribute to produce a very substantial improvement in the economy and general practicality of the process for both laboratory and commercial scale operations.

Having described our invention in detail, we claim:

1. In the process of forming pentaerythritol in an aqueous alkaline medium by reacting formaldehyde, acetaldehyde, and an alkali in the ratio of about 4 mols to 1 mol to 1 equivalent, the step of including with said components in the reaction mixture not exceeding a catalytic amount of an added non-metallic catalyst capable of being formed by condensation of components of said reaction mixture during the course of said reaction.

2. In the process of forming pentaerythritol by reaction of a mixture of formaldehyde, acetaldehyde, and an alkali in the ratio of about 4 mols of formaldehyde to 1 mol of acetaldehyde to 1 equivalent of alkali in an aqueous medium at a temperature in the range from about 17.5° to about 55° C., the step of including in said reaction mixture at the beginning of the reaction, in an amount not exceeding a catalytic quantity, an added non-metallic catalyst capable of being formed therein from components of said mixture of formaldehyde, acetaldehyde, and water in the course of the reaction.

3. The invention as defined in claim 2, wherein the added catalyst is one capable of being formed in said reaction mixture from formaldehyde and water.

4. The invention as defined in claim 2, wherein the added catalyst is one capable of being formed in said reaction mixture by condensation of formaldehyde with itself and water.

5. The invention as defined in claim 2, wherein the added catalyst is one capable of being formed in said reaction mixture by reaction of formaldehyde with itself.

6. The invention as defined in claim 2, wherein the added catalyst is one capable of being formed in said reaction mixture by reaction of formaldehyde and acetaldehyde.

7. The invention as defined in claim 2, wherein the added catalyst is one obtained from the residue of a previous reaction of the same character after pentaerythritol formed in the course of the previous reaction has been recovered therefrom.

8. The invention as defined in claim 2, wherein the added catalyst is at least a portion of the residue of a previous reaction of the same character after pentaerythritol formed in the course of the reaction has been recovered therefrom.

9. The invention as defined in claim 2, wherein the added catalyst is glycerine.

10. The invention as defined in claim 2, wherein the added catalyst is ethylene glycol.

11. The invention as defined in claim 2, wherein the added catalyst is dihydroxy diethyl ketone.

12. In the process of preparing pentaerythritol by reacting formaldehyde with actealdehyde in an alkaline medium, the step of adding a catalytic quantity of gylcerine.

13. In the process of preparing pentaerythritol by reacting formaldehyde with actealdehyde in an alkaline medium, the step of adding a catalytic quantity of ethylene glycol.

14. In the process of preparing pentaerythritol by reacting formaldehyde with actealdehyde in an alkaline medium, the step of adding a catalytic quantity of an autocatalyst obtained from the residue of a previous reaction of the same character after pentaerythritol formed in the course of the previous reaction has been recovered therefrom.

15. In the process of preparing pentaerythritol by reacting formaldehyde with actealdehyde in an alkaline medium, the step of adding a catalytic quantity of dihydroxy diethyl ketone.

16. The process of preparing pentaerythritol which comprises reacting formaldehyde, acetaldehyde, and an alkali in the ratio of about 4 mols of formaldehyde to 1 mol of actealdehyde to 1 equivalent of alkali in an aqueous medium containing, in an amount not exceeding a catalytic quantity, an added non-metallic catalyst capable of being formed from said reactants in the course of said reaction.

17. The process of claim 16 in which the added catalyst is one capable of being formed in said reaction mixture from formaldehyde and water.

18. The process of claim 16 in which the added catalyst is one capable of being formed in said reaction mixture by reaction of formaldehyde with itself.

19. The process of claim 16 in which the added catalyst is one capable of being formed in said reaction mixture by reaction of formaldehyde and acetaldehyde.

20. The process of claim 16 in which the added catalyst is one obtained from the residue of a previous reaction of the same character after pentaerythritol formed in the course of the previous reaction has been recovered therefrom.

21. The process of claim 16 in which the added catalyst is glycerine.

22. The process of claim 16 in which the added catalyst is ethylene glycol.

23. The process of claim 16 in which the added catalyst is dihydroxy diethyl ketone.

JOHN CRYER,
JAY C. OWENS.
RICHARD JUI FU LEE.

REFERENCES CITED

The following references are of record in the file of this patent:

UNITED STATES PATENTS

| Number | Name | Date |
| --- | --- | --- |
| 1,878,040 | Voss | Sept. 20, 1932 |
| 2,170,624 | Wyler | Aug. 22, 1939 |
| 2,372,602 | Owens | Mar. 27, 1945 |

OTHER REFERENCES

Berichte, 63B, page 2686 (1930) (Friederich & Brun).